United States Patent
Juhasz et al.

(10) Patent No.: US 10,750,431 B2
(45) Date of Patent: Aug. 18, 2020

(54) SAFETY DISARM FOR FIREARM

(71) Applicants: Paul R. Juhasz, Houston, TX (US); Christopher Frerking, Concord, NH (US); James Tiernan, Seabrook, TX (US)

(72) Inventors: Paul R. Juhasz, Houston, TX (US); Christopher Frerking, Concord, NH (US); James Tiernan, Seabrook, TX (US)

(73) Assignee: Deadzone US, LLC, Houston, TX (US)

( * ) Notice: Subject to any disclaimer, the term of this patent is extended or adjusted under 35 U.S.C. 154(b) by 0 days.

(21) Appl. No.: 15/663,660

(22) Filed: Jul. 28, 2017

(65) Prior Publication Data

US 2017/0374603 A1   Dec. 28, 2017

Related U.S. Application Data

(63) Continuation of application No. 15/620,288, filed on Jun. 12, 2017, now Pat. No. 9,913,200, which is a continuation of application No. 13/462,712, filed on May 2, 2012, now Pat. No. 9,681,358, which is a continuation of application No. 12/571,090, filed on Sep. 30, 2009, now abandoned.

(60) Provisional application No. 62/368,828, filed on Jul. 29, 2016, provisional application No. 62/368,833, filed on Jul. 29, 2016, provisional application No.
(Continued)

(51) Int. Cl.
| | |
|---|---|
| *H04M 3/00* | (2006.01) |
| *H04W 48/02* | (2009.01) |
| *H04W 4/029* | (2018.01) |
| *H04W 4/02* | (2018.01) |

(52) U.S. Cl.
CPC .......... *H04W 48/02* (2013.01); *H04W 4/029* (2018.02); *H04W 4/02* (2013.01)

(58) Field of Classification Search
None
See application file for complete search history.

(56) References Cited

U.S. PATENT DOCUMENTS

| | | |
|---|---|---|
| 6,449,892 B1 | 9/2002 | Jenkins |
| 8,127,482 B2 | 3/2012 | O'Shaughnessy et al. |
| (Continued) | | |

OTHER PUBLICATIONS

Article, N. Y. Times, "Smart Guns Save Lives. So Where are They," Jan. 17, 2015, Nicholas Kristoff (4 pages).

*Primary Examiner* — Erika A Washington
(74) *Attorney, Agent, or Firm* — The Juhasz Law Firm

(57) ABSTRACT

A firearm is provided with an electronic control system which monitors and controls the firearm. The electronic control system is coupled to a lower level system which may be one or more parts employed in the discharge of a firearm; or an assemblage of parts that configure the firearm into an armed or disarmed state of operation. Image data on a target, firearm system status data, and/or other data may be detected by sensors or collected, under the direction of and processed by the electronic control system. The electronic control system provides control signals to a firearm subsystem adapted to the lower level system to in response to a detected condition to allow operation of the lower level system to operate the firearm. A touch-sensitive screen may allow a firearm operator and an arm/disarm control interface may allow a remote operator or service to monitor and control the firearm.

68 Claims, 9 Drawing Sheets

Related U.S. Application Data

62/369,620, filed on Aug. 1, 2016, provisional application No. 61/195,016, filed on Oct. 2, 2008.

(56) References Cited

U.S. PATENT DOCUMENTS

| | | | |
|---|---|---|---|
| 8,464,451 B2 * | 6/2013 | McRae | F41A 17/06 42/1.01 |
| 8,850,733 B1 | 10/2014 | Oster | |
| 9,115,944 B2 * | 8/2015 | Arif | F41A 17/063 |
| 9,435,597 B2 * | 9/2016 | Goren | H04W 48/04 |
| 2008/0214211 A1 | 9/2008 | Lipovski | |
| 2014/0290109 A1 * | 10/2014 | Stewart | F41A 17/063 42/70.01 |
| 2016/0054083 A1 * | 2/2016 | Kiyani | F41A 17/063 42/70.11 |
| 2016/0219252 A1 | 7/2016 | Blanco et al. | |

* cited by examiner

| Firearm | Registrant Info | Registration Date | Permitted Firearm Users | Firearm User recognition | Date of Use | Location of Use | Other |
|---|---|---|---|---|---|---|---|
| | | | | | | | |
| | | | | | | | |
| | | | | | | | |

SAFETY DISARM FOR FIREARM

RELATED APPLICATIONS

This application claims priority to and the benefit of each the following applications, the contents of which are hereby incorporated by reference in their entirety: Provisional Application Ser. No. 62/368,828 filed Jul. 29, 2016 titled "Safety Disarm for Firearm;" Provisional Application Ser. No. 62/368,833 filed Jul. 29, 2016, titled "Dead Zone for Wireless Communication Device;" Provisional Application Ser. No. 62/369,620 filed Aug. 1, 2016 titled "Safety Disarm for Firearm;" and Ser. No. 15/620,288, filed Jun. 12, 2017, titled "Dead Zone for Wireless Communication Device", which is a Continuation of Non-provisional application Ser. No. 13/462,712, filed May 2, 2012 which issued as U.S. Pat. No. 9,681,358, which is a continuation of application Ser. No. 12/571,090 filed Sep. 30, 2009, abandoned, which claims priority from Provisional Application 61/195,016, filed Oct. 2, 2008.

TECHNICAL FIELD

The present disclosure is directed to firearms. More specifically, this disclosure is directed to a safety disarm for a firearm.

BACKGROUND

There is growing tension between the Second Amendment right of the people to bear arms and the protection of innocent people against injury or death from intentional or accidental discharge of a firearm.

There are features provided on a gun to provide greater safety. See, for example, http://guns.wonderhowto.com/how-to/use-each-three-safety-features-colt-model-1911-series-80-handgun-390775/

There is a need for a safety disarm of a firearm to minimize casualties from intentional shootings of innocent people as happened in San Bernardino and Orlando as well as accidental discharge of a firearm including by children playing.

Unless otherwise indicated herein, the materials described in this section are not prior art to the claims in this application and are not admitted to be prior art by inclusion in this section.

SUMMARY

A firearm is provided with an electronic control system which monitors and controls the firearm. The electronic control system of the firearm is coupled via connection to lower level systems. The lower level system may be one or more parts of the firearm employed in the discharge of a firearm. Alternatively, the lower level system may be an assemblage of parts that configure the firearm into an armed or disarmed state of operation. The electronic control system of the firearm may be electrically coupled to various sensors onboard the firearm. Image data on a target, firearm system status data, and/or other data may be detected by sensors or collected, under the direction of the electronic control system, and processed by the electronic control system. The electronic control system is electrically coupled to, and provides control signals to a firearm subsystem (e.g., firearm subsystems, such as firearm latch controllers, transmission controllers, latch actuators, etc.) that implement motion and/or other function control. The firearm subsystem is adapted to the lower level system, the firearm subsystem configured to obstruct the operation of the lower level system. In operation, image, system status, or other data may be processed by the electronic control system of the firearm, and the electronic control system of the firearm in response may issue appropriate control signals to firearm subsystems to control the arm/disarm functionality of the firearm by allowing or disallowing operation of the lower level system.

The firearm may be provided with an arm/disarm control interface illustratively including a touch-sensitive screen through which a firearm operator may monitor and control the firearm. The firearm may be provided with an arm/disarm control interface through which a remote operator or service may monitor and control the firearm.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
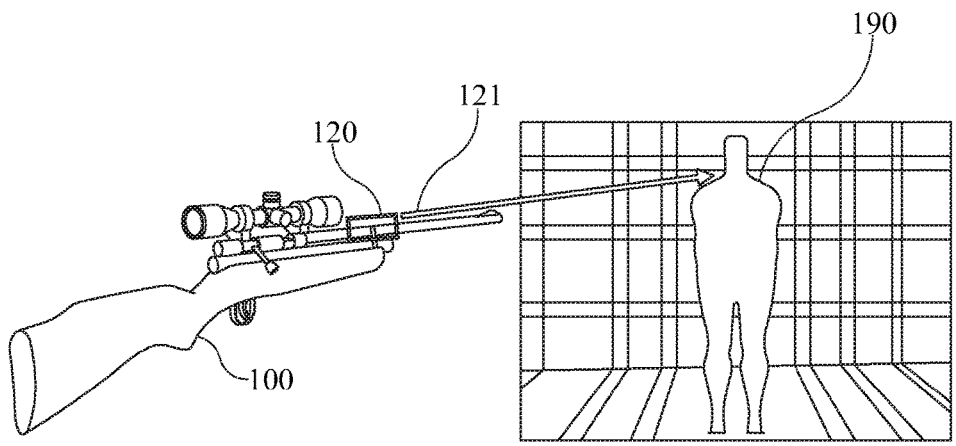
FIG. 1 shows a firearm with a safety disarm according to an example embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This detailed disclosure further incorporates by reference the disclosure provided in Provisional Application Ser. No. 62/368,828 filed Jul. 29, 2016 titled "Safety Disarm for Firearm;" Provisional Application Ser. No. 62/368,833 filed Jul. 29, 2016, titled "Dead Zone for Wireless Communication Device;" Provisional Application Ser. No. 62/369,620 filed Aug. 1, 2016 titled "Safety Disarm for Firearm;" and Ser. No. 15/620,288, filed Jun. 12, 2017, titled "Dead Zone for Wireless Communication Device", which is a Continuation of Non-provisional application Ser. No. 13/462,712, filed May 2, 2012 which issued as U.S. Pat. No. 9,681,358, which is a continuation of application Ser. No. 12/571,090 filed Sep. 30, 2009, abandoned, which claims priority from Provisional Application 61/195,016, filed Oct. 2, 2008.

In general, a system, method, and a computer program product may be implemented for controlling a firearm. A firearm is provided with an electronic control system which monitors and controls the firearm. The electronic control system is coupled to a lower level system. The lower level system may be a one or more parts of the firearm employed in the discharge of a firearm. Alternatively, the lower level system may be an assemblage of parts that configure the firearm into an armed or disarmed state of operation. The electronic control system of the firearm may be electrically coupled to various sensors onboard the firearm. Image data on a target, firearm system status data, and/or other data may be detected by sensors or collected, under the direction of the electronic control system, and processed by the electronic control system. The electronic control system is electrically coupled to, and provides control signals to a firearm subsystem (e.g., firearm subsystems, such as firearm latch controllers, transmission controllers, latch actuators, etc.) that implement motion and/or other function control. The firearm subsystem is adapted to the lower level system, the firearm subsystem configured to obstruct the operation of the lower level system. The electronic control system is configured to provide a control signal to the firearm subsystem in response to a detected condition to allow operation of the lower level system to operate the firearm by allowing or disallowing operation of the lower level system. The firearm may be provided with an arm/disarm control interface illustratively including a touch-sensitive screen through which a firearm operator may monitor and control the firearm. The firearm may be provided with an arm/disarm control interface through which a remote operator or service may monitor and control the firearm.

FIG. 1 depicts a firearm 100 with an electronic control system 120 of this disclosure. The firearm is aimed 121 at an object 190 in a shape of a human in this example. The electronic control system 120 processes the image information on the object 190 and in turn issues appropriate control signals to firearm subsystems to control the arm/disarm functionality of the firearm as explained below.

Figure 2:
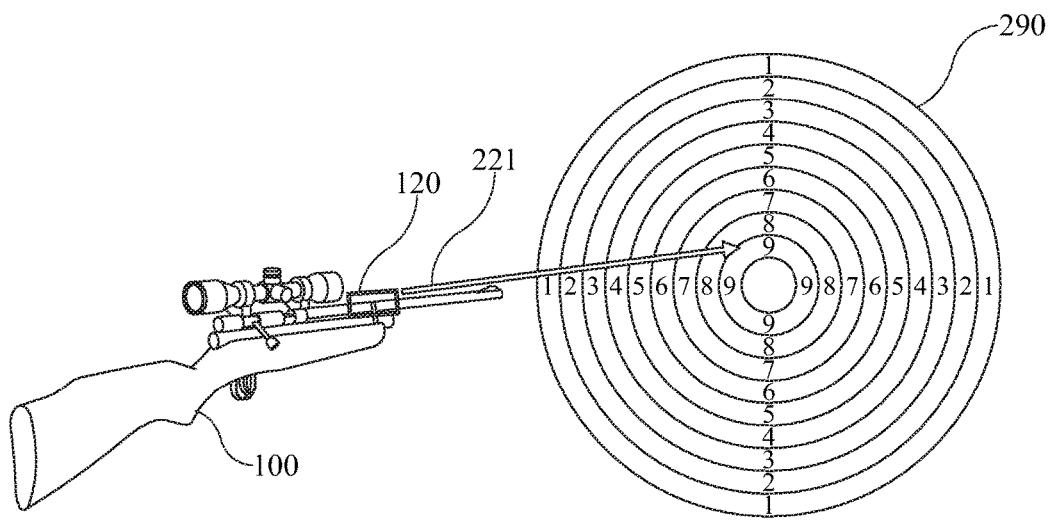
FIG. 2 shows a firearm with a safety disarm according to an example embodiment.

FIG. 2 depicts a firearm 100 with an electronic control system 120 of this disclosure. The firearm is aimed 221 in this case at an object 290 in a shape that is other than the shape of a human in this example. In this case the shape is in the shape of a target of the kind used at a target range. The electronic control system 120 processes the image information on the object 190 and in turn issues appropriate control signals to firearm subsystems to control the arm/disarm functionality of the firearm as explained below.

Figure 3:
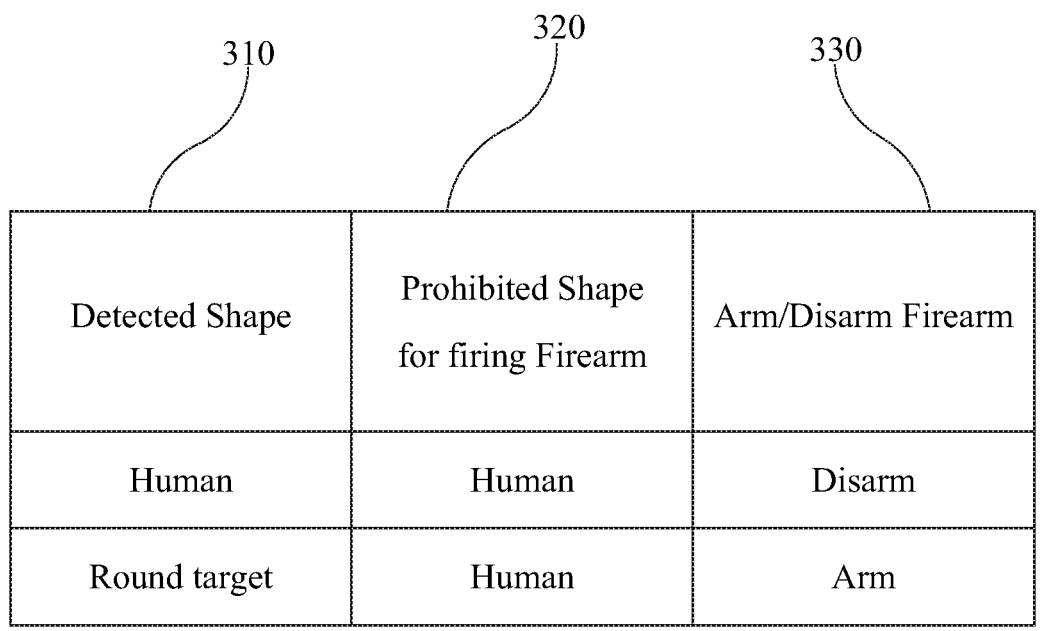
FIG. 3 shows an illustrative memory map for use in the operation of the firearm shown in FIGS. 1 and 2 according to this disclosure.
Figure 4:
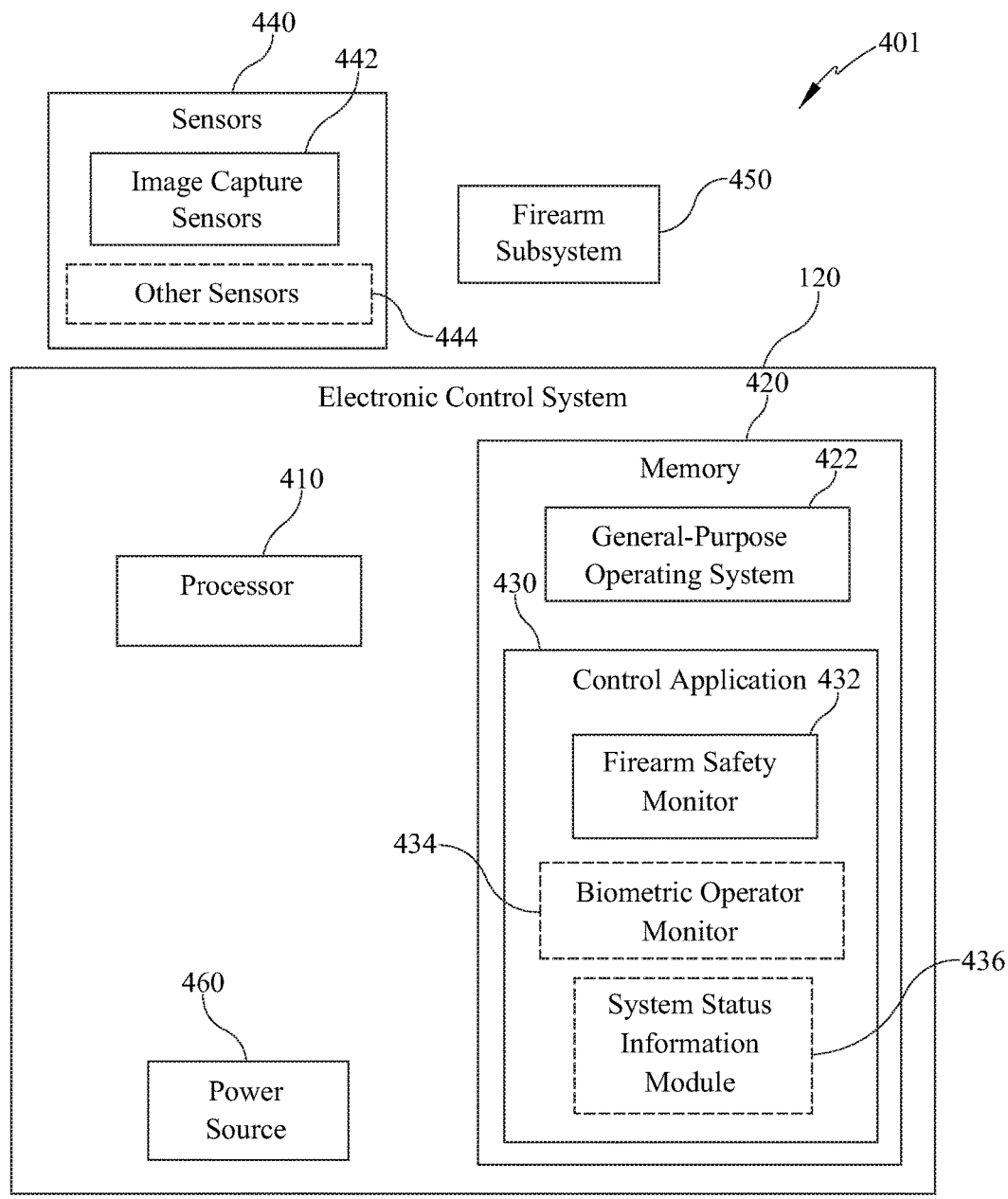
FIG. 4 shows an illustrative embodiment of this disclosure.

FIG. 3 shows a memory map illustratively residing in memory 430 shown in FIG. 4 and illustratively used by a fire safety monitor 432. The memory map depicts the detected shape of the target at which a firearm is aimed and the response of the electronic control system 120 of this disclosure in response thereto. If the detected shape 310 at which the firearm is pointing at is a shape that is prohibited from firing at 320, such as a shape indicative of a human, the electronic control system 120 will cause the firearm to be disarmed 330 meaning that the firearm will be in a disarm state in which it may not be fired. If the firearm is pointing at a permitted shape for firing at 320, such as a round target that may be indicative of a target of the kind used at a target range, the electronic control system 120 will cause the firearm to be armed 330 meaning that the firearm will be in an armed state in which it may be fired.

FIG. 4 shows the electronic control system 120 depicted in FIGS. 1 and 2 comprising a processor 410 and a memory 420.

Processor 410 may be hardware and software configured to process instructions. The processor may be implemented in any number of ways. Such ways include, by way of example and not of limitation, digital and/or analog processors such as microprocessors and digital-signal processors (DSPs); controllers such as microcontrollers; software running in a machine; programmable circuits such as Field Programmable Gate Arrays (FPGAs), Field-Programmable Analog Arrays (FPAAs), Programmable Logic Devices (PLDs), Application Specific Integrated Circuits (ASICs), any combination of one or more of these, and so on.

Memory 420 may be any physical device capable of storing information temporarily or permanently. Memory may be implemented in any number of ways. Such ways include, by way of example and not of limitation, nonvolatile memories (NVM), read-only memories (ROM), random access memories (RAM), any combination of these, etc. Memory 420 may include programs containing instructions for execution by processor 420. The programs provide instructions for execution by the processor 420, and can also include instructions regarding protocols and decision making analytics, etc. that can be used by sensors 440 as explained below. In addition, memory 420 can store rules, configurations, data, etc.

At least some of the software and data structures stored in the memory implement a general-purpose operating system 422 that functionally organizes the electronic control system 422. The general-purpose operating system 422 may be a type of operating system, that is capable of executing a variety of types of software applications, including applications related to firearm control.

A further portion of the software and data structures stores a control application 430 that is utilized to control motion, and potentially other functions, of the firearm as disclosed herein. The control application 430 includes a firearm safety module 432, a biometric operator monitor 434, and a system status information module 436.

The firearm safety module 432 may be hardware and software configured to monitor and control the firearm. In this regard, the electronic control system of the firearm is coupled to a lower level system as explained below. Illustratively, the lower level system may be an assemblage of parts that configure the firearm into an armed or disarmed state of operation. Alternatively, the lower level system may be one or more parts employed in the discharge of a firearm. In one illustrative embodiment, the electronic control system of the firearm is electrically coupled to one or more sensors 440 onboard the firearm as explained below. Image data on a target, firearm system status data, and/or other data may be detected by sensors or collected, under the direction of and processed by the electronic control system. The electronic control system is also electrically coupled to, and provides control signals to firearm subsystems 450 (e.g., firearm subsystems, such as firearm latch controllers, transmission controllers, latch actuators, etc.) that implement motion and/or other function control. The firearm subsystem is adapted to the lower level system. Illustratively, the firearm subsystem may be configured to obstruct the operation of the lower level system as explained below. In operation, image, system status, or other data is collected through the electronic control system of the firearm, and the electronic control system of the firearm in turn issues appropriate control signals (such as the arm or disarm firearm instructions disclosed in FIGS. 3 and 13) to firearm subsystems to control the arm/disarm functionality of the firearm by allowing or disallowing operation of the lower level system. The foregoing described functions of data collection and control signal application to control the arm/disarm functionality of the firearm are illustrative of the functions that the firearm safety module 432 may be configured to do.

The biometric operator module 434 may be hardware and software configured to calculate one or more biometric data or metrics, determine therefrom identity indicia on the operator currently using the firearm, and based on the identity indicia, permit or disable arm/disarm functionality of the firearm as described below. Biometric data or metrics may include one or more of data samples, models, fingerprints, similarity scores and verification or identification data.

Biometric data or metrics may be used to authenticate a user of the firearm for purposes such as identification and access control. Biometric operator monitor may employ a biometric identification technique such as face recognition, fingerprint identification, hand geometry biometrics, retina scan, iris scan, signature, voice analysis, and so to authenticate a user and access control. For example, if the biometrics of an operator do not match the biometrics of an authorized firearm operator encoded in the electronic control system (e.g., the operator is not the registered user of the firearm), the biometric operator module may not arm the firearm.

Alternatively, if the operator is not the registered user of the firearm, the biometric operator module may perform one or more other sequences, such as a sequence to determine, notwithstanding the operator not being the registered user of the firearm, whether the operator is someone otherwise authorized to use the firearm. For example, in the illustrative embodiment of FIG. 11, a cloud service may be provided comprising a registry of biometric or other data on law enforcement officers. The biometric operator module may provide to the cloud service the biometric or other data on the person seeking to use the firearm. The cloud service may then perform a set of instructions to determine whether the provided biometric data of the intended user matches the biometric data of a law enforcement officer. If there is a match, the cloud service may communicate to the biometric operator monitor to provide control instructions to arm the firearm for use by the intended user.

The system status information module 436 may be hardware and software configured to provide system status information that may include data on why a firearm remains disarmed notwithstanding the desire of the operator to use the firearm, information on the condition of the firearm, instructions on what an operator may do in order to disarm the firearm, and so on. For example, the status data may indicate that the biometric recognition failed; try again. Or the status data may indicate that the target shape is prohibited; try another target. The status data may also indicate that the power source is low; recharge or change battery. Other information may also be provided.

To provide feedback to an operator on the system status information, the electronic control system may also include a speaker, to issue voice prompts, etc. The electronic control system may also include visual gauges like a gauge to indicate the amount of power left and a gauge that changes in a condition such as changing a color, such as green, when a firearm is armed according to this disclosure, and another color, such as red, when the firearm is disarmed.

Figure 9:
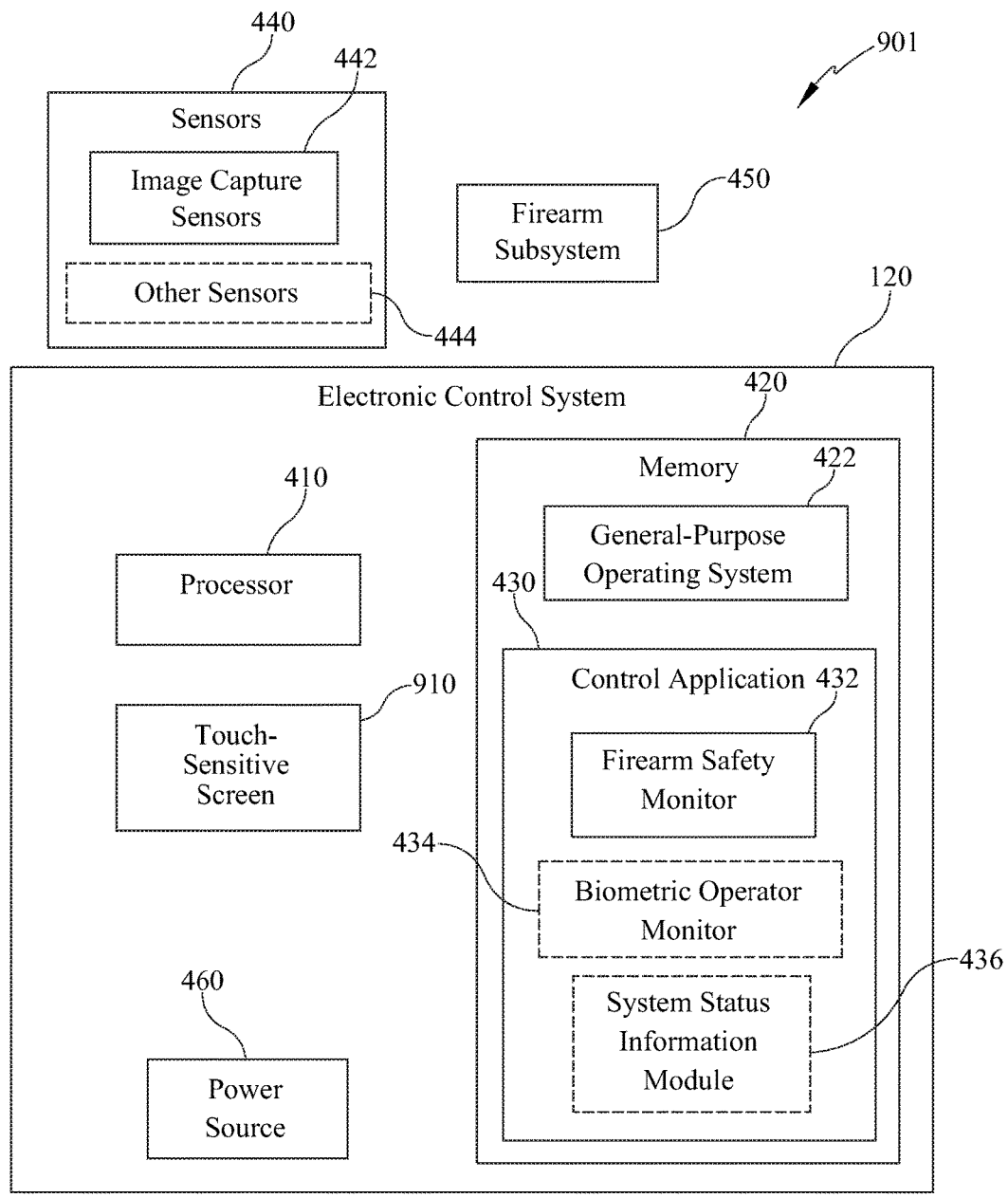
FIG. 9 shows an illustrative embodiment of this disclosure with an arm/disarm control interface through which a firearm operator may monitor and control the firearm.

The electronic control system may also include an arm/disarm control interface illustratively including a touch-sensitive screen to allow a firearm operator to interface with the electronic control system as explained in FIG. 9. The electronic control system may also include an arm/disarm control interface through which a remote operator or service may monitor and control the firearm as disclosed in FIG. 10.

The electronic control system may be provided with a microphone for the electronic control system to receive voice commands, such as by an operator, like "try again" or "reboot", and so on.

Figure 10:
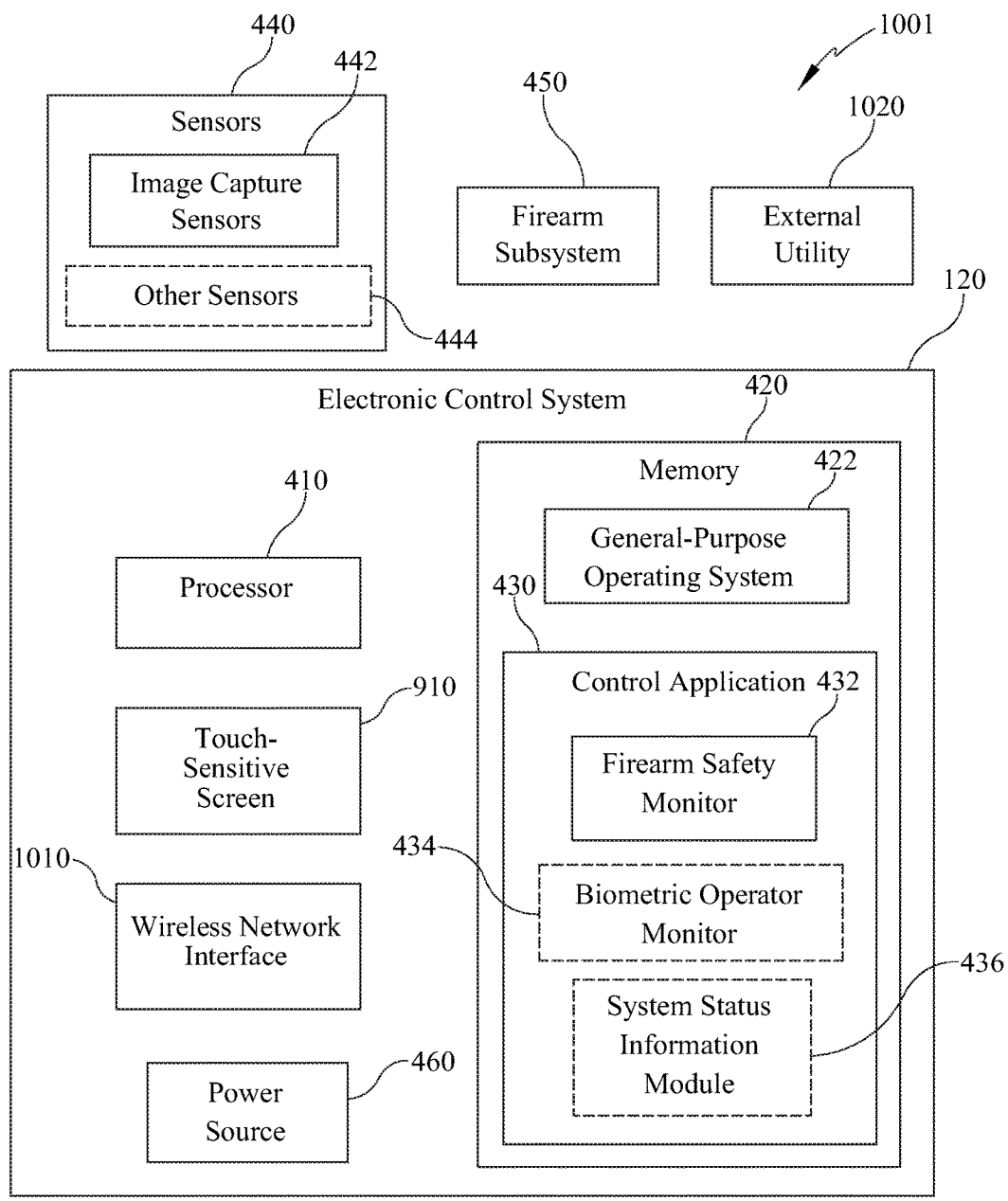
FIG. 10 shows an illustrative embodiment of this disclosure with an arm/disarm control interface through which a remote operator can monitor and control the firearm.

In embodiments in which a touch-sensitive screen is provided to the electronic control system as described in FIG. 9, the system status information for the firearm may be displayed on a user interface (UI) on a touch-sensitive screen 910 (FIG. 9), and the touch-sensitive screen may receive control input indicating desired motion and other function control, when firearm operator control is permitted. The desired motion may be scrolling, navigating, and zooming image data and system status data rendered on the touch-sensitive screen. As depicted in FIG. 10, this control input may be passed to a network through wireless network interface 1010 for transmission back to an external utility 1020 (FIG. 10) over a wireless network, when permitted.

FIG. 4 shows additional to the electronic control system 120 an illustrative system of this disclosure further comprising sensors 440 and firearm subsystem 450.

Sensors 440 comprise an image capture sensor, another sensor, or a combination of both. The image capture sensor may be hardware and software configured to capture an image. Image capture sensors 442 typically include one or more light sensors. A light source may also be included to emit light to be reflected off an object. The light sensors capture and translate the reflected light into electrical signals. The image captured may be a photo image. For example, the light sensors may be a high-pixel resolution CCD (charge coupled device) chip and it and associated hardware may be used for generating digital images. The software for processing the captured images may reside in the memory 430 or a section of memory associated with the firearm safety monitor 432 if the captured images are for use by the firearm safety monitor. Alternatively, the image capture sensors 442 may be provided with a processor and a memory for storing and executing this image processing software.

Other sensors may include heat, location accelerometer, a gyroscope, a magnetometer, a proximity sensor, a gravity sensor, a linear accelerometer, and so on. Additional sensors may include light sensor, camera sensors, microphone sensors, touch sensors, pressure sensor, temperature sensor, humidity sensor, and so on.

Firearm subsystem 450 are functionalities provided to a firearm by this disclosure, such as firearm latch controllers, transmission controllers, latch actuators, etc., which implement motion or other function control.

Figure 5:
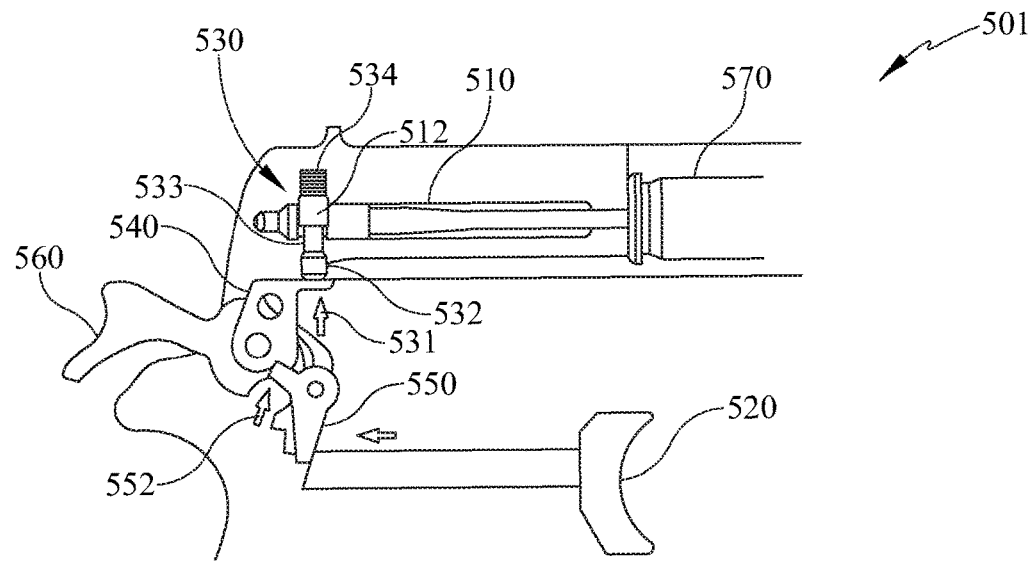
FIG. 5 shows an illustrative embodiment of one prior art lower level system.

FIG. 5 shows an illustrative embodiment of one prior art lower level system 501 in a firearm known as the firelock pin block mechanism (FPB). The FPB is a well-known safety feature on, for example a Colt 1911 series 80 handgun, which blocks the firing pin. The purpose of the FPB is to prevent firelock pin 510 from moving forward unless trigger 520 is depressed. This "mechanism is designed to prevent "accidental discharges" caused by dropping the pistol or catastrophic mechanical failures. As is well known in the prior art, on depressing trigger 520, a trigger bar lever 550 is caused to rotate clockwise 552 as depicted in FIG. 5, causing a firelock pin plunger lever 540, with which the trigger bar lever 550 is in mechanical engagement, to rotate counterclockwise. This causes an upward force 531 on a firelock pin plunger 532 of a firelock pin block safety 530, causing upward movement of the firelock pin block safety 530 within an opening 512 of the firelock pin 510. When a narrow portion 533 of the firelock pin block safety is within opening 512 of the firelock pin 530, the firelock pin is no longer restricted from forward movement. On further depressing of the trigger 520, a hammer 560 is released to contact the firing pin, causing the firelock pin to accelerate forward under the force of the hammer contact against a bullet 570 causing the bullet and hence the firearm to fire.

Figure 6:
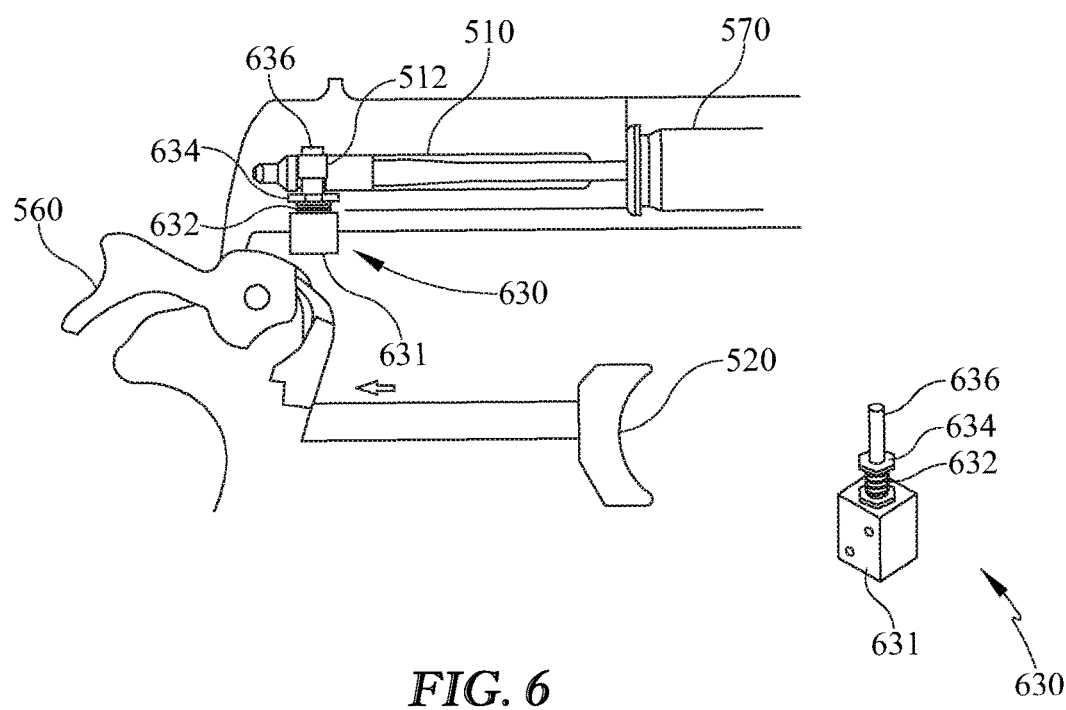
FIG. 6 shows an illustrative embodiment of one lower level system with firearm subsystem according to this disclosure.

FIG. 6 shows an illustrative embodiment of one lower level system with firearm subsystem 601 according to this disclosure. As shown, when this disclosure enables the firearm to be armed, then on depressing of the trigger 520, the hammer 560 is released from a restricted position and allowed to strike the firelock pin 510. The firelock pin is caused to accelerate forward under the force of the hammer contact against the bullet 570 causing the bullet and hence the firearm to fire.

Disablement of the firearm is by the firearm subsystem which illustratively comprises a latch actuator 630. Illustratively latch actuator 630 comprises a DC solenoid electromagnet which is normally open. This means that without electrical energization of a magnetic coil disposed within the latch actuator, a plunger 636 remains in an expanded position within opening 512 of the firing pin 510 by spring 632 against portion 634, blocking the forward movement of the firing pin 510. Hence, any contact of the hammer against the firing pin will not cause the firearm to discharge since the firing pin is restricted from forward movement by plunger 636 of the latch actuator. On energization of a magnetic coil inside housing 631, the plunger 636 is retracted inside the housing 631 of the latch actuator 630 allowing the firing pin 510 to move forward under the influence of force imparted by the hammer 560 and against the bullet 570 causing the bullet and hence the firearm to fire.

Referring back to FIG. 4, the electronic control system further comprises a power source. Illustratively, the power source is a battery that provides power sufficient to operate the electronic control system and firearm subsystems according to this disclosure. The battery may be a replaceable battery in which event a removable panel may be provided to a compartment housing the battery to permit access to and replacement of a battery. Alternatively, the battery may be a chargeable battery in which event a charging port may be provided to a compartment housing the battery to permit charging of the battery.

In operation, image, system status, or other data is collected through the electronic control system of the firearm as previously disclosed, and the electronic control system of the firearm in turn issues appropriate control signals to firearm subsystem, or firearm subsystems if more than one firearm system is employed, to control the arm/disarm functionality of the firearm. Hence, when, for example, the firearm is pointing at a target that in accordance with the memory map of FIG. 3 is an impermissible target for firing upon (e.g., a human), the electronic control system 120 may not energize the magnetic coil and hence the firing pin and hence firearm are restricted from firing. If the firearm is pointing at a permissible target, however, the electronic control system may energize the magnetic coil and allow the firing of the firearm.

Figure 7:
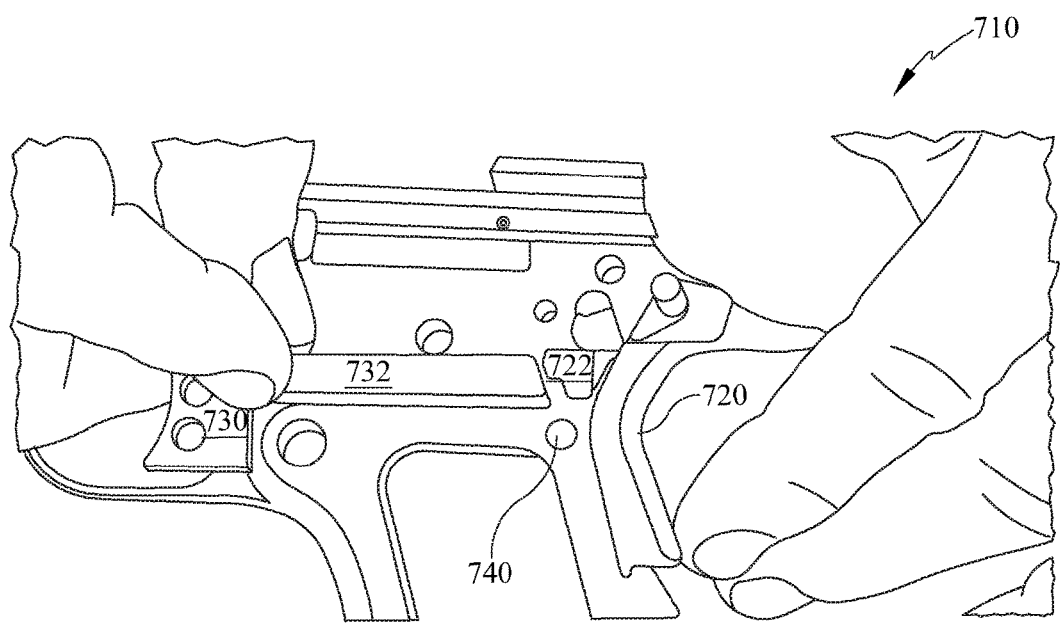
FIG. 7 shows an illustrative embodiment of one lower level system with firearm subsystem according to this disclosure.

FIG. 7 shows an illustrative embodiment of one lower level system with firearm subsystem 710 according to this disclosure adapted to a grip safety feature (GS) 720 of a firearm. The GS 720 blocks rearward movement of a trigger 730. As shown, a tab 722 blocks the rearward movement of the trigger 730. Disablement of the firearm is by a firearm subsystem which illustratively comprises a latch actuator 740 in this embodiment. Latch actuator may be similar to the latch actuator 630 but appropriately sized and configured for use in this application. While in this embodiment a latch actuator 740 is used other electrically activated mechanisms for blocking the movement of a part of a firearm required to discharge a bullet may be used for the firearm subsystem. Where a latch actuator similar to the latch actuator 630 is used, without electrical energization of a magnetic coil disposed within the latch actuator, a plunger 636 remains in an expanded position; blocking the rearward movement of the trigger. Hence, the hammer is restricted from contacting the firing pin to cause the firearm to discharge since the trigger is restricted from movement by plunger 636 of the latch actuator. On energization of the magnetic coil, the plunger 636 is retracted inside the housing of the latch actuator allowing the trigger to free the hammer to strike the firing pin to strike a bullet and discharge the firearm.

Figure 8:
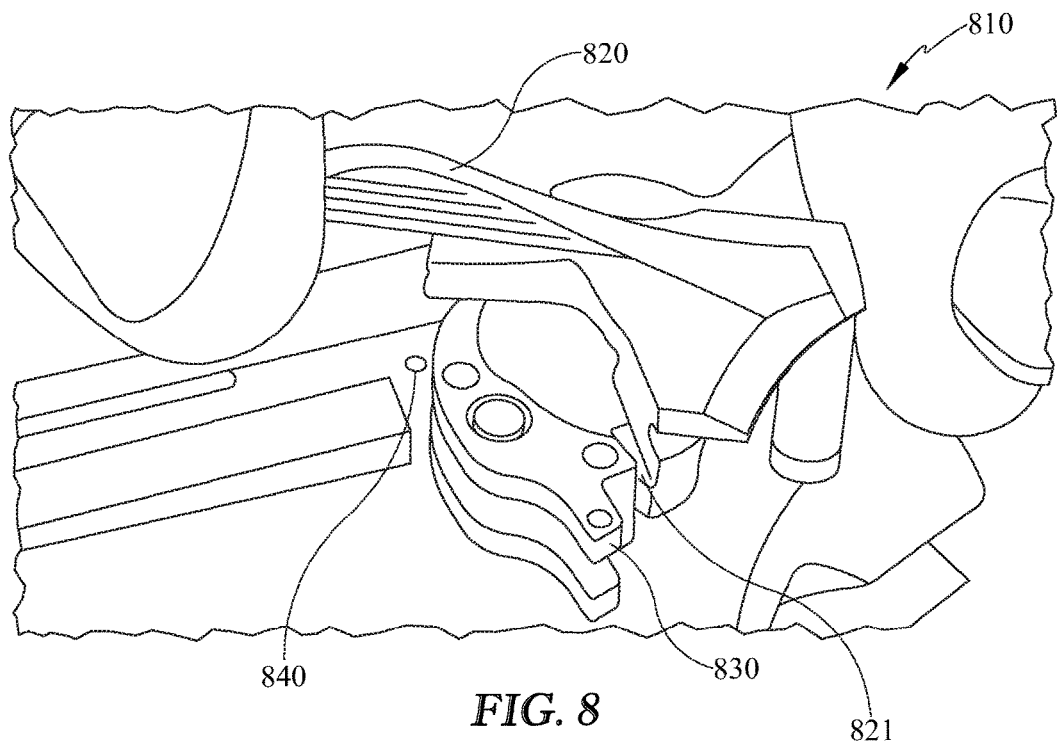
FIG. 8 shows an illustrative embodiment of one lower level system with firearm subsystem according to this disclosure.

FIG. 8 shows an illustrative embodiment of one lower level system with firearm subsystem 810 according to this disclosure adapted to a thumb safety (TS) feature 820 of a firearm. A tab 821 on TS feature 820 blocks a sear 830 from releasing the hammer. When the TS feature 820 is moved to the firing position, the sear 830 is free to move out of a position where a notch is restricting the hammer. Disablement of the firearm is by the firearm subsystem which illustratively comprises a latch actuator 840. Latch actuator may be similar to the latch actuator 630 but appropriately sized and configured for use in this application. While in this embodiment a latch actuator 840 is used, other electrically activated mechanisms for blocking the movement of a part of a firearm required to discharge a bullet may be used. Where a latch actuator similar to the latch actuator 630 is used, without electrical energization of a magnetic coil disposed within the latch actuator, a plunger 636 remains in an expanded position; blocking the sear 830 from moving its hammer notch out of the way of the hammer. Hence, the hammer is restricted from contacting the firing pin to cause the firearm to discharge since the trigger is restricted from movement by plunger 636 of the latch actuator. On energization of the magnetic coil, the plunger 636 is retracted inside the housing of the latch actuator allowing the sear to move out of the hammer notch to free the hammer to strike the firing pin to strike a bullet and discharge the firearm.

While the firearm subsystem may be according to this disclosure described above, other actuator latch controllers, transmission controllers, latch actuators, or mechanisms that restrict movement of a part of a firearm required to discharge a round may be used with this disclosure. More specifically, any electrically activated mechanism that blocks the movement of a part of a firearm required to discharge a bullet may be used with this disclosure as explained herein.

FIG. 9 shows the electronic control system 120 depicted in FIG. 4 further comprising a touch-sensitive screen 910. The elements in FIG. 4 shown in FIG. 9 bear the same number in FIG. 9 as they do in FIG. 4, with the explanation of those elements in FIG. 4 applicable to those elements in FIG. 9.

The touch-sensitive screen is a computer display screen that is also an input device. In this disclosure, a touch-screen is adapted for use with the electronic control system of this disclosure. Illustratively, the touch-screen may be integrated with the electronic control system to allow an operator of the firearm to provide input commands to the electronic control system and to scroll, navigate, and zoom image, system status, and other data rendered on the touch-sensitive screen. Alternatively, any arm/disarm control interface may be used in place of the touch-screen.

The screens are sensitive to pressure; a user interacts with the computer by touching pictures or words on the screen. The touch-sensitive screen 910 is configured to visually display information and to received input, including touches and gestures entered by an operator. Alternatively, the touch-sensitive screen 910 may be provided by wireless mobile devices. Illustrative examples of wireless mobile devices include tablet computers, smartphones, and certain portable media players that execute general-purpose operating systems and may be configured to wirelessly communicate with the electronic control system of this disclosure. The wireless communication of the wireless mobile device with the electronic control system may be over a wireless network interface 1010 described below in connection with FIG. 10. Alternatively, the wireless mobile devices or other arm/disarm control interface, such as a monitor, may be hardwire tethered to the electronic control system of this disclosure through communication ports provided in each.

As described above, with such a touch-sensitive screen provided to the electronic control system, the image, system status, or other data may be displayed on a user interface (UI) on a touch-sensitive screen 910 (FIG. 9), and may receive control input indicating desired motion and/or other function control via the UI, when firearm operator control is permitted.

The desired motion may be scrolling, navigating, and zooming image, system, and other data rendered on the touch-sensitive screen. This control input may be passed to the network through wireless network interface 1010 for transmission back to an external utility 1020 (FIG. 10) over a wireless network 180, when permitted.

Control may be permitted an operator to access data, such as image, system status, other data, update data, and/or confirm data, and so on. For example, a hunter may have permission to access system status data in order to understand why a firearm won't arm. A firearm bureau may have permission to update status data over a network as disclosed in FIG. 10. In the illustrative example, the firearm bureau may be permissible operators of the firearm. A law enforcement officer may have permission to arm a firearm that is not his own. Permission may be illustratively granted using the cloud service registry on biometric data previously explained.

Permission may be given a user of the firearm in other situations after the electronic control system of this disclosure has identified a condition that would normally keep the firearm in a disarmed mode of operation. For example, if a law enforcement officer is in hot pursuit of armed robbers, the target of the firearm would be a human which may be a pre-condition not allowing the firearm to be fired in an illustrative embodiment. However, the law enforcement officer may, for example, using permissions, over-ride the disarm of the firearm to allow the firearm to be fired upon the armed robbers. Permissions may be encoded in the electronic control system or stored in a cloud service including a registry of persons with permission to operate a firearm.

The initial disarm provided a firearm by this disclosure illustrates how the disarm mode of operation of this disclosure may provide a law enforcement officer (or others with permission to over-ride a disarm condition of a firearm) with a first alert that a precondition for a disarm has been satisfied and so the firearm is disarmed. This first alert data may be used by operators with permission to disarm in deciding whether or not to over-ride the disarm. Where, for example, the target is a human involving armed robbers, the law enforcement officer may over-ride the disarm of the firearm notwithstanding the first alert data in order to be able to use the firearm to apprehend the armed robbers.

However, if the officer is aiming at a target not realizing it to be a human or is doing so and pulling the trigger in the heat of the moment, the first alert data may allow the law enforcement officer to reflect on whether the human is a target by mistake or in the heat of the moment. The may allow the law enforcement officer to think twice before over-riding the safety disarm feature of this disclosure and firing the firearm. Indeed, this feature may have prevented the recent knee jerk firing by a law enforcement officer in Minneapolis on an innocent Australian woman in the heat of the moment by forcing the officer to think twice before pulling the trigger of his firearm.

In another example of this disclosure, military soldiers may have permission for over-ride when in battle against enemies. On the other hand, the biometric operator monitor, for example, of this disclosure may keep the firearm from falling into and being used by enemy hands since the biometric monitor may keep the firearm disarmed should that happen.

In the embodiment of FIG. 9, the firearm is provided with an arm/disarm control interface illustratively including a touch-sensitive screen through which a firearm operator may monitor and control the firearm. The electronic control system is coupled to a lower level system. The lower level system may be a one or more parts of the firearm employed in the discharge of a firearm. Alternatively, the lower level system may be an assemblage of parts that configure the firearm into an armed or disarmed state of operation. The electronic control system of the firearm may be electrically coupled to various sensors onboard the firearm. Image data on a target, firearm system status data, and/or other data may be detected by sensors or collected, under the direction of the electronic control system, and processed by the electronic control system. The electronic control system is electrically coupled to, and provides control signals to a firearm subsystem (e.g., firearm subsystems, such as firearm latch controllers, transmission controllers, latch actuators, etc.) that implement motion and/or other function control. The firearm subsystem is adapted to the lower level system, the firearm subsystem configured to obstruct the operation of the lower level system. The electronic control system is configured to provide a control signal to the firearm subsystem in response to a detected condition to allow operation of the lower level system to operate the firearm by allowing or disallowing operation of the lower level system. In addition, the image, status, and/or other data may be propagated to the arm/disarm control interface through which an operator may monitor and control the firearm.

FIG. 10 shows the electronic control system 120 depicted in FIG. 9 further comprising a wireless network interface 1010. The elements in FIG. 9 shown in FIG. 10 bear the same number in FIG. 10 as they do in FIG. 9, with the explanation of those elements in FIG. 9 applicable to those elements in FIG. 9.

Illustratively, the wireless network interface 1010 comprises transceiver circuitry and software for sending and receiving packets over a wireless network (e.g., an IEEE 802.11 WLAN). Alternatively, the transceiver may be hardware and software configured to transmit data to and from the electronic control system and a network or an external device including Wi-Fi, blue tooth CDMA, and so on, that enables a wireless communication link for between the electronic control system and an external device.

In an alternative embodiment, the wireless network interface 1010 may be combined with or replaced by a hardwire connect for electrically connecting the electronic control system to the network by wire, such as one or more ports and associated circuitry and software that allow wired communication between the electronic control system and an external device (e.g., an Ethernet connector, an RS232 connector, a USB or other wire connector.)

A hardwire connect may be used, for example, to tether a smart phone to the electronic control system to enable the functionality of the smart phone to assist, augment, enhance, or complement functionality that is provided by the electronic control system. In one example, the tether permits the wireless network interface of the smart phone to be used by the electronic control system to communicate with external devices or a network. For example, a smart phone received and held in a pocket of a garment worn by the operator may be tethered to the electronic control system so as to allow the smart phone to communicate with the electronic control system to perform the functionalities of this disclosure. For example, the touch-screen of the display may provide the touch sensitive screen 910 of the electronic control system. In another example, the wireless network interface of the smart phone provides the wireless communication link with a network.

In another embodiment, the hardwire connect may be in the form factor of a docking station for receiving and holding the smart phone firmly to the firearm and electrically connecting the smart phone to the electronic control system. The docking station may be provided with an electrical connector for mating with the charge port of a smart phone to provide an electrical connection between the two. The docking station may provide a simplified way of plugging in the smart phone to the electronic control system of this disclosure. The wireless network interface 1010, hardwire connect, or both may enable any computing device to be electrically connected to the electronic control system of this disclosure. By computing device is meant servers, intermediary servers, personal computers, cellular phones, smart phones, wireless computers, wireless lap-top computers, mobile devices such as tablet computers, pad computers, personal digital assistant, wireless sensors or networks of sensors, such as mesh network sensors, and so on may be in electrical communication with to provide functionality to the electronic control system.

In another illustrative embodiment, a wireless mobile device such as a smartphone or other computing device may provide the electronic control system of this disclosure. For example, a smartphone may replace the electronic control system in, for example, FIGS. 4, 9, and 10. In this embodiment, the smartphone may provide the processor, memory, and wireless network interface functionalities of the electronic control system according to this disclosure. The battery of the smartphone may provide power for the firearm subsystem or enhance a power system provided the firearm for operating the firearm subsystem.

In another embodiment, the firearm may be provided with a docking station for receiving and holding and electrically connecting a smart phone or other mobile computing device that is functioning as electronic control system firmly to the firearm. The docking station may be as previously described except that the electrical connection provided by the docking station may serve to connect the smart phone to the firearm subsystem so as to allow control signals from the smart phone to operate the firearm subsystem. The electrical connection may also connect the smart phone to sensors on the firearm, in embodiments in which sensors are on the firearm. Alternatively, the sensors on the smart phone may provide the functionality of the sensors according to the disclosure. For example, a camera on the smart phone may capture the image of a target according to this disclosure. The control application on the smartphone in this embodiment may be configured to provide the control signals arming and disarming a firearm according to the teachings of this disclosure. In other embodiments, sensors on the firearm and in the smart phone may be combined in performing the function of the sensors according to the disclosure.

In an alternative embodiment, the electronic control system on a firearm a computing device connected thereto according to this disclosure may distribute the electronic control system functionality across both electronic control system on firearm and computing devices.

In another embodiment, a plurality of firearms may be tethered or wirelessly connected to an off boarded computing device. The computing device may serve the plurality of firearms in one or more ways, such as by validating the operator, arming the firearms in the case of military troops preparing for battle, and so forth. A plurality of firearms in a hunting area may be wirelessly connected to a remote computing device for purposes of monitoring and controlling the firearm in the hunting area, such as by disarming a firearm when an operator is aiming at a target in the shape of human while hunting.

In the embodiment in FIG. 10, the touch-sensitive screen may also enable an operator of the firearm to pass data to the network through wireless network interface 1010 for transmission back to an external utility 1020 (FIG. 10) over a wireless network 180, when permitted. The touch-sensitive screen may also render on the display of the touch-sensitive screen data received over the wireless network 180 from a cloud service or other external utilities over the network. For instance, data streamed into the electronic control system for rendering on the touch-sensitive screen (or for broadcast audibly) may include data on why a firearm remains disarmed, data requiring the operator to perform certain steps before arming of the firearm, data resulting from a biometric check done by a cloud server as previously described, and so on.

The external utility may provide a control signal to wireless network interface 1010 for use by electronic control system in controlling the firearm as disclosed herein.

Even after a firearm is armed according to the teachings of this disclosure, the touch-sensitive screen may allow streaming of data to assist, inform, coach, and so on the operator in connection with the use of the firearm. For example, the data feed could be of weather; a message from a family member or friend, a message from hunters that they are in the area or a message on sighting of prey; coaching from a network service on proper use of the firearm, or on adjustments to the use of the firearm based on general or historical data, and so on. For instance, the electronic control system of the firearm may observe the target, the trajectory of a fired bullet, detect movement of the operator in connection with the pulling of the trigger, and so on, and provide coaching to the operator to correct same. On detecting body movement, the electronic control system may make visual (e.g., on the touch-screen display) or audio recommendations to the operator on corrections such as "don't jerk," "hold steady", "aim higher", and so on. Other audio and video features may be provided by the electronic control system of this disclosure. For example, coaching may be provided to an operator of the firearm by a person or service over a network via loudspeaker provided with the electronic control system of this disclosure. A microphone on the electronic control system may allow for interactive communication exchange between an operator and an entity over the network—be it a family member, a friend, a fellow operator of a firearm, a firearm coaching provider, interactive cloud services, and so on.

In one illustrative embodiment, the firearm is provided with an arm/disarm control interface through which a remote operator can monitor and control the firearm. The electronic control system is coupled to a lower level system. The lower level system may be a one or more parts of the firearm employed in the discharge of a firearm. Alternatively, the lower level system may be an assemblage of parts that configure the firearm into an armed or disarmed state of operation. The electronic control system of the firearm may be electrically coupled to various sensors onboard the firearm. Image data on a target, firearm system status data, and/or other data may be detected by sensors or collected, under the direction of the electronic control system, and processed by the electronic control system. The electronic control system is electrically coupled to, and provides control signals to a firearm subsystem (e.g., firearm subsystems, such as firearm latch controllers, transmission controllers, latch actuators, etc.) that implement motion and/or other function control. The firearm subsystem is adapted to the lower level system, the firearm subsystem configured to obstruct the operation of the lower level system. The electronic control system is configured to provide a control signal to the firearm subsystem in response to a detected condition to allow operation of the lower level system to operate the firearm by allowing or disallowing operation of the lower level system.

Figures 11, 12:
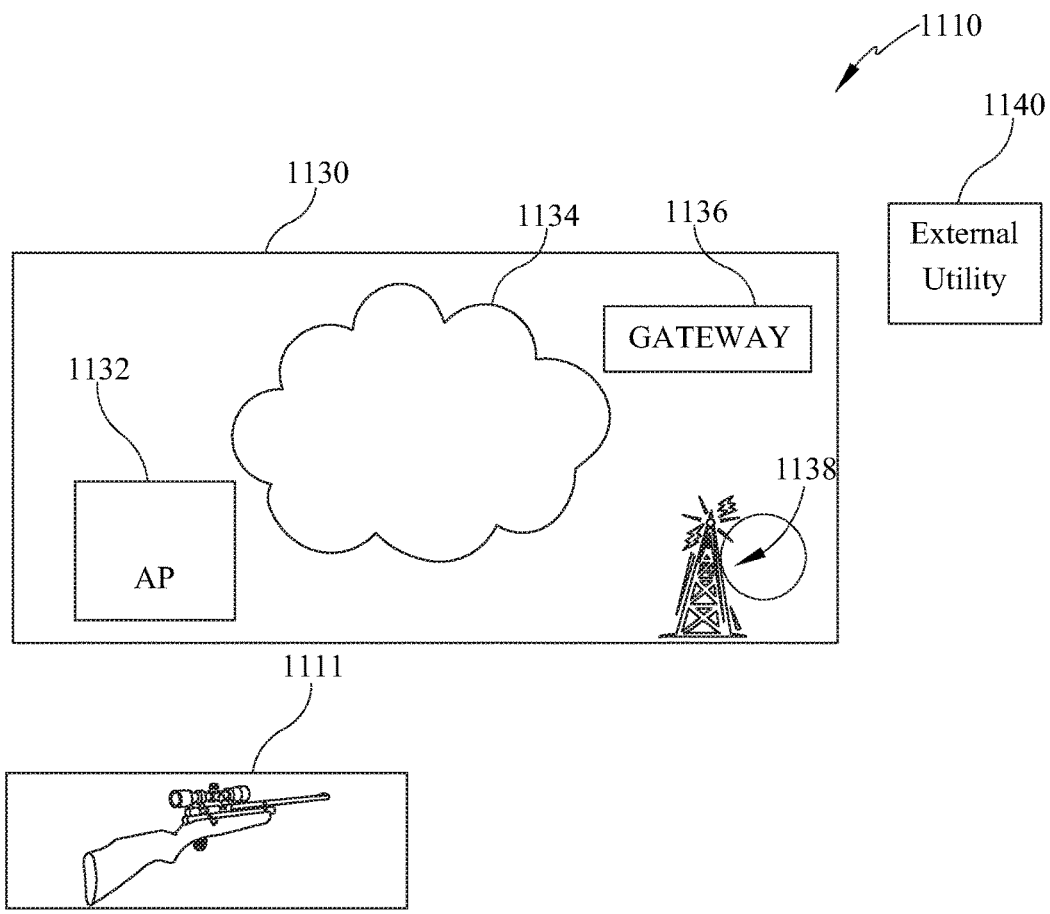
FIG. 11 shows an illustrative embodiment of FIG. 10 of this disclosure.
FIG. 12 shows an illustrative memory map for use in the operation of the firearm shown in FIGS. 10 and 11.

FIG. 11 shows an illustrative embodiment system 1110 implementation of FIG. 10 of this disclosure comprising a firearm control system 1111 (e.g., the electronic control system 120 and sensors 440 of FIG. 10), a network 1130, and an external utility 1140.

Firearm control system 1111 has been previously described.

Network illustratively may include access point 1132, base station 1138, a cloud 1134, and a gateway 1136. Network may include an access point or base station or both. Networking may also occur on a peer-to-peer basis where possible.

Access point 1132 is a station that transmits and receives data (sometimes referred to as a transceiver). An access point connects users to other users within the network and also can serve as the point of interconnection between the WLAN and a fixed wire network. A base station is a fixed point of communication for customer cellular phones on a carrier network. A cloud is a network of computers through which data passes between two end points. A gateway 1136 is a network node that connects two networks using different protocols together.

External utility 1140 comprises one or more programmed computers that may be connected to the electronic control system 120 wirelessly or by wired connection in order to allow for the exchange of data and control signals between the electronic control system and the external utility through wireless network interface 1010 and/or hardware connection as previously explained. The external utility of this disclosure may be a cloud server. A server may be any computer configured to serve the requests of client programs running on the same or other computers on a network. The computer of the external utility may be a host computer configured to serve the requests of one or more client programs residing in the safety disarm module. Alternatively, the computer of the external utility may serve a client residing on the external utility or on some other computer to which the external utility may be connected. Depending on the computing service that the server is configured to offer, the server may include one or more of a file server for storing and making files accessible for reading and writing to the client, a print server that manages one or more printers, a network server that manages network traffic, a mail server that manages mail on a network, a database server that allows clients to interact with a database, a firearm server for managing firearm records, and so on. The server may also be in communication with one or more other servers that may include one or more of the foregoing or other servers. Each of the foregoing and servers may provide a service to the firearm operator. For instance, the print server may enable a firearm operator to print an image of a target or print information on why the firearm was not armed, or information on the use of the firearm such as day and time of use, time of firing, number of firings, location, and so on. Sensors associated with the firearm may track movement of the firearm for printing by the print server for investigative, historical, archival, or other purposes.

The computer of the external utility may be any computer (e.g., end user device or server) including servers, intermediary servers, personal computers, cellular phones, smart phones, wireless computers, wireless lap-top computers, mobile devices such as tablet computers, pad computers, personal digital assistant, and wireless sensors or networks of sensors, such as mesh network sensors. These examples are not intended to be limiting, and the present disclosure is not limited to these examples of computing device. In one illustrative embodiment, the computing device may be a user equipment such as a cellular phone, a smart phone, or other device, such as a tablet or a personal digital assistant containing a multi applications processor configured to execute a mobile application. In other embodiments, any computing device configured to execute an application to provide a data service according to this disclosure may be used as the computing device of this disclosure.

The external utility 1140 in FIG. 11 may be configured to serve the firearm control system 1111 in controlling the operation of the firearm and in supporting the operator of the firearm. In one example, the illustrative memory map for operation of the firearm shown in FIG. 3 which may reside in the electronic control system, may alternatively reside on an external utility, such as a cloud server. The cloud server may allow for shape, pattern, data recognition, and so on at a level more complicated and sophisticated than possible on the electronic control system to take place in order to make the arming of the firearm control system of this disclosure based on target shape, etc., more robust and effective.

Control application 430 of this disclosure, for example as illustrated in FIGS. 4, 9, and 10 may comprise software configured to create a communication link between the electronic control system and the cloud server so as to allow the electronic control system and the service to communicate. The control application may be downloadable software, embedded software, and so on. In another example, the cloud server may allow for complex biometric metrics to be generated for use by the biometric operator monitor 434 of the electronic control system of this disclosure, for example as illustrated in FIGS. 4, 9, and 10. This may make the arming of the firearm according to this disclosure based on the biometric identity of the operator more robust and effective.

In another example, the cloud server may allow for system status data to be generated for use by the system status information module 436. This may make the feeding of system status data to the firearm control system of this disclosure more robust and effective.

In another embodiment, as shown in FIG. 12, an illustrative memory map for operation of the firearm shown in FIGS. 10 and 11 may reside on a cloud server. Data on the firearm, firearm registrant, registration data, permitted firearm operators, firearm operator recognition, date of use, location of use, firearm restrictions, and so on may be managed by way of a service on a cloud server and used to arm or disarm a firearm, stream data, provide guidance or coaching to an operator, and so on.

In another example, a person near or remotely located from an operator of the firearm may, if permitted, send control signals to the electronic control system of the disclosure over the network or peer-to-peer (where such communication is provided) to disarm the firearm with his smart phone or other computing device in certain situations according to the teachings of this disclosure. For instance, where a firearm is being fired on people outside or inside a room or building, as happened in San Bernardino and Orlando, a person in the room or building or outside or elsewhere may, if authorized to do so, send a control to the electronic control system of the discharging firearm to disable the firearm according to the teachings of this disclosure. For example, a person in a room in which people are being fired upon may send a signal to a cloud service that manages firearm use to prompt the cloud server to send a disarm signal to the discharging firearm to disarm same. Alternatively, the person may call 911 to do the same. Alternatively, a server that is configured to monitor a firearm may detect a target of a firearm in the shape of a human and may send a control signal through the network to the firearm to turn off the firearm. This example may occur where, for example, the firearm control system is configured to disarm on certain conditions other than the shape of the target at which the firearm is aimed. For example, the firearm control system may not configured to disarm based on target shape when a firearm is aiming at a human. Or where lighting or some other condition may prevent accurate shape recognition functionality at the firearm safety monitor level but not at the cloud server level where more sophisticated software may allow same. Or where an operator managed to tamper with the shape functionality at the firearm level so that it is not working at the firearm safety monitor level in which case the shape recognition service on the cloud may provide a redundant shape recognition system. The cloud service may also locate one or more firearms in the location where the firearm is being discharged and either disarm those firearms to prevent them from getting into the hands of the perpetrator of the firearm discharge or provide instructions to the caller, persons inside or outside the building, or others to help the person locate and use the firearm to take down the perpetrator.

In another example, surveillance cameras on premises or surveyed areas may monitor the presence of events like a firearm, a firearm operator, other persons, and so on and provide surveillance data to a cloud service. The video feed may be continually streamed to the cloud service or triggered on detection of an event. The triggering event may be an on-site administrator of the surveillance cameras, an authorized on-site personnel, and so on. An on-site recorder may be provided to process surveillance data from the surveillance cameras and on detection of an event, the recorder may be internally triggered to send the video feed to the cloud service. Alternatively, the feed may be an audio video feed (e.g., include an audio component), an audio feed, and so on. The cloud service may process the data and investigate, take action such as sending a control signal to disarm the firearm, and so on in order prevent discharge of the firearm in the surveyed space.

In one embodiment, homes and establishments may subscribe to a service that provides this or other kind of firearm safety service for their premise or surveyed areas. An establishment or home may allow surveillance feed captured by surveillance cameras to be communicated to the firearm safety service either continually or when a firearm on the premises is detected. For example, the surveillance feed may be stored on an on-site recorder. An employ of the establishment may trigger the streaming of the video feed to the cloud service on detection of a firearm on the premise or any irregular behavior of a person on the premise. Alternatively, the cloud service may track firearm movement and be configured to trigger surveillance cameras on a premise to provide video feed when the firearm moves onto the premises of the subscriber. The surveillance feed may allow for remote video identifying and monitoring individuals with firearms and their behavior. The service may be in communication with an employ of the establishment, such as by phone call, text messaging and so on, in the event of any suspicious behavior for purposes of securing additional data for use in further investigating the situation and taking preemptive measures if needed. If a firearm is used in a way that fits within a pattern of suspicious activity, the cloud service may disarm the use of the firearm according to the teachings of this disclosure if needed.

In another embodiment, the image capture sensors 442 previously described, such as in connection with FIGS. 4, 10, and 11, may be configured to capture images when the trigger of a firearm is activated. Alternatively, the image capture sensors may be configured to capture images when some other image capture trigger on or off the firearm is activated. For example, the electronic control system may be configured to detect movement of the trigger of a firearm and activate the image capture sensors 442 to capture a snap shot or a video stream of the discharge of a firearm at a target.

Alternatively, the electronic control system may capture a snap shot or a video stream responsive to activation of an image capture trigger electrically connected to the electronic control system. In this example, a snap shot or video image may be taken even when the firearm trigger is not activated since activation in this cases occurs upon activation of the image capture trigger. Illustratively, the image capture trigger may reside on the firearm and be activated by the operator. Alternatively, the image capture trigger may reside on a smart phone or other computing device providing electronic control functionality to the firearm.

In another example, the image capture trigger may reside on a smart phone or other computing device and operate independently of and even without the electronic control system, firearm subsystem, and other arm/disarm features of this disclosure. For example, a firearm may be provided with a mechanical docking station to mechanically connect and hold a smart phone or other mobile computing device to the firearm. An image capture trigger on the smart phone may be activated by an operator to capture snap shot or video images. Because of the mechanical association of the smart phone with the firearm as disclosed herein (e.g. mechanical connection between the two which causes the two devices to maintain an alignment between the two), snap shot or video images taken by the camera may be of images that are within or about the target of the firearm. For example, the camera in the smart phone may capture images in view of a firing scope or generally in the direction of aim of a firearm. In another example, the smart phone may be positioned to have the optical axis of the camera perpendicular to the line of sight of the firearm in order to allow capture of images taken along one, or if two cameras pointing in opposite directions are used, both sides of the firearm.

In another embodiment, the touch-sensitive screen of an electronic control system may render images captured by a camera of a smart phone attached to the firearm according to this disclosure. In an embodiment, where the camera of the smart phone is capturing images to the side, back and so on of the operator, those images may be rendered on the touch-sensitive screen of the electronic control system to allow the operator to observe events occurring about him as he may be advancing or aiming at a target. For example, while aiming at a target, a hunter may observe on his touch-sensitive screen an approaching lion captured to the side, back and so on. With this data, the hunter may take pre-emptive action. A law enforcement officer or military soldier may be firing on a target and observe an approaching or the enemy on the touch-sensitive screen. This allows the operator to see events to the side and "in the rear view mirror" so to speak in order to prevent harm to himself from an advancing person or thing.

In another embodiment, the image capture trigger may be activated remotely by a cloud service or person over the network of this disclosure.

Where a smart phone or other computing device for example is providing electronic control system functionality, the camera of the smart phone may capture the snap shot or video stream of a target or things to the side or back of the operator as previously indicated. The snap shot or video stream may be recorded on the memory 420 of the electronic control system. The snap shot or video stream may be downloaded at a later point in time to a computing device wirelessly or using a tether according to the teachings of this disclosure.

The foregoing embodiments illustrate that functionalities of the electronic control system according to this disclosure (e.g., image capture functionality) may be used to arm/disarm a firearm. But they may also be used for other functions. Some of these other functionalities may be employed without configuring the electronic control system to perform an arm/disarm functionality. Hence, this disclosure provides functionality to a firearm that can arm/disarm a firearm, capture image data, and to do other things. One functionality that may be employed even if the electronic control system is not configured to arm/disarm is the image capture functionality as previously explained. Other non-limiting functionalities that may be employed even if the electronic control system is not configured to arm/disarm is firearm movement (e.g., GPS, location tracking, and so on), firearm discharge (e.g., the electronic control system may detect firearm discharge and record same with time stamp, or other information), and so on.

A snap shot or video stream may be wirelessly or by wire transmitted in real time, in batch time, in intervals or later to a cloud service, an external computer, a computing device, and so on for storage. The received data may be stored in an account set up by the firearm owner or other person or entity authorized to use the firearm or access data from the firearm. The authorized person or entity may be a firearm service provider or a firearm bureau such as a government office tasked with firearm use, safety, and so on. It may be a store that sold the firearm. The owner may subscribe to a service that allows historic, archival, administrative, investigative, and/or so services to allow retrieval of the snap shot or video stream according to the subscription. The other person or entity authorized to access the snap shot or video may access the snap shot or video stream for regulatory, investigatory as well as historic, archival, administrative and/or so on services. The services provided by this disclosure may have helped authorities in Minneapolis understand why an unarmed Australian woman was shot by an officer who did not have his camera turned on in violation of enforcement protocol since this disclosure enables an operator of a firearm to capture snapshots and video to memorialize a firearm discharge, a hunt, target practice, and so on. It also allows for more robust monitoring and control of a firearm by facilitating investigatory, regulatory, historic, archival, administrative and so on services in connection with a firearm after discharge. It also allows for same before discharge, by for example, tracking of a firearm, change of operator registration, and so on.

Before and/or after arming of a firearm, the touch-sensitive screen of this disclosure may allow streaming of data to assist, inform, coach, and so on the operator in connection with the use of the firearm. For example, the data feed could be of weather; a message from a family member or friend, a message from hunters that they are in the area or a message on sighting of prey; coaching from a network service on proper use of the firearm, or on adjustments to the use of the firearm based on general or historical data. For instance, the firearm may observe misalignment of the trajectory of the bullet with respect to the gun sight and provide coaching to the operator to correct same. The firearm may detect the response of the body of the operator after discharge and make recommendations to the operator on corrections such as adjusted body posture, less body movement when pulling the trigger, and so on.

The principles of dead zone may also be used to control the safety disarm module to arm or disarm a firearm. These principles are taught in the dead zone disclosures this application claims priority to and the benefit of identified above, the contents of which have been hereby incorporated by reference. For example the electronic control system of a firearm may be disarmed if the firearm is in a predetermined zone in which use of a firearm is not permitted. In this example a register of firearm dead zone locations may be located either in the cloud, including on a wireless smart phone connected to the electronic control system via wireless connection, or on the electronic control system itself or both. If the firearm is in one of the firearm dead zones, the firearm is disarmed according to this disclosure so that the firearm may not be used while in the dead zone. For example, if the cloud service detects that the firearm is in a church, a restaurant, or other place where a firearm should not be used, the cloud service may disarm the firearm. On leaving the dead zone, the firearm may be armed by the electronic control system according to the teachings of this disclosure.

The electronic control system of this disclosure may also be programmed and updated over-the-air with software updates, electronic control system configurations and settings, firearm subsystem configurations and settings, predetermined zones in which the firearm is to be disable, and so on.

Figure 13:
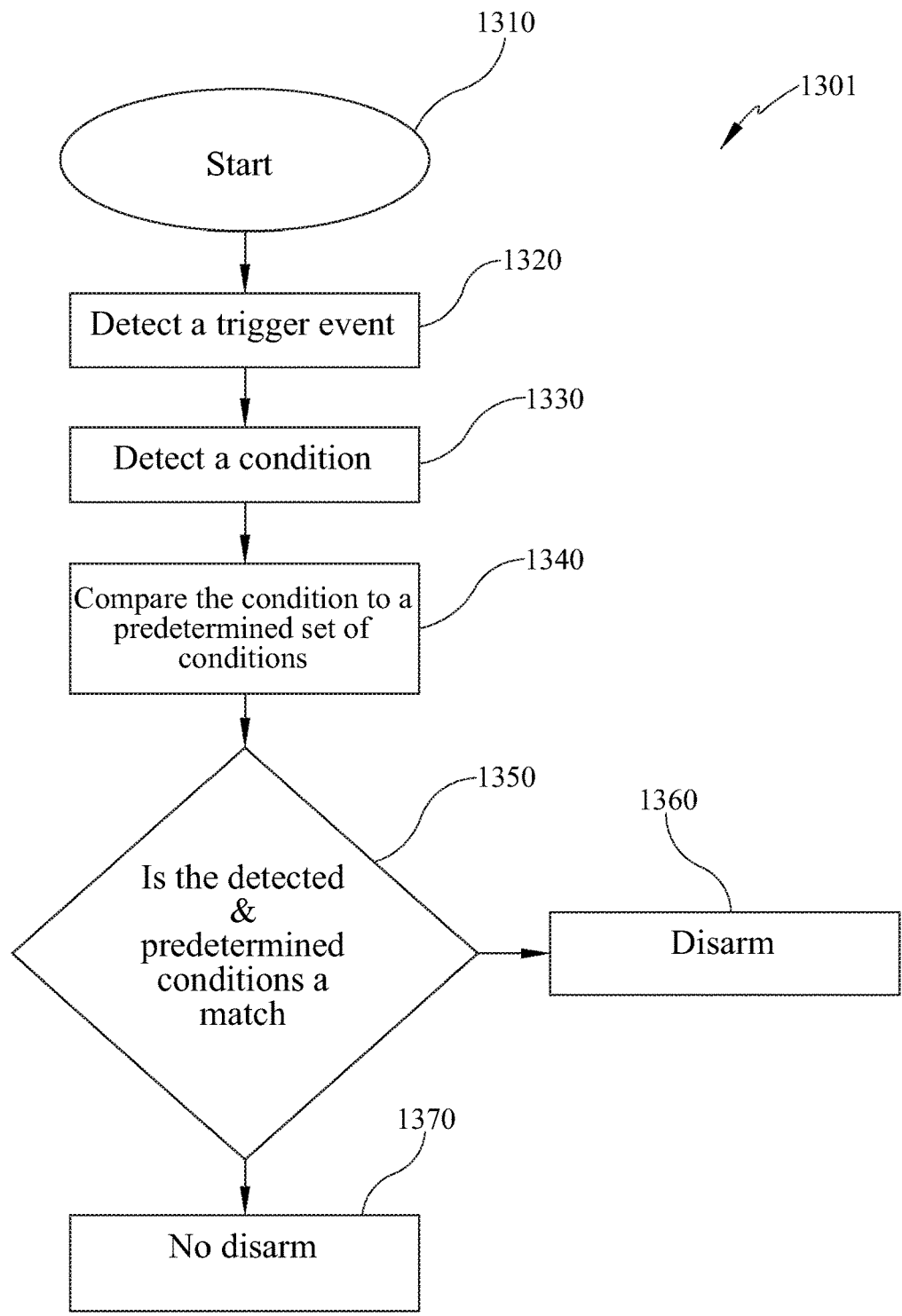
FIG. 13 shows a method of this disclosure.

FIG. 13 shows an illustrative method of this disclosure. The method advances from start 1310 to detecting a trigger event. If a trigger event is detected, the method detects a condition 1330. For example, the condition may be the shape of the target, the identity of an operator, and so on. In step 1340, the method compares the detected condition to a predetermined set of conditions. For example, the detected shape would be compared to a predetermined set of shapes. At step 1350, the method determines whether the comparison yields a match. If comparison yields a match, the firearm is disarmed 1360. If the comparison yields no match, the firearm is armed for firing.

There is thus disclosed a firearm provided with an electronic control system which monitors and controls the firearm. The electronic control system of the firearm is coupled via connection to lower level systems. The lower level system may be one or more parts of the firearm employed in the discharge of a firearm. Alternatively, the lower level system may be an assemblage of parts that configure the firearm into an armed or disarmed state of operation. The electronic control system of the firearm may be electrically coupled to various sensors onboard the firearm. Image data on a target, firearm system status data, and/or other data may be detected by sensors or collected, under the direction of the electronic control system, and processed by the electronic control system. The electronic control system is electrically coupled to, and provides control signals to a firearm subsystem (e.g., firearm subsystems, such as firearm latch controllers, transmission controllers, latch actuators, etc.) that implement motion and/or other function control. The firearm subsystem is adapted to the lower level system, the firearm subsystem configured to obstruct the operation of the lower level system. In operation, image, system status, or other data may be processed by the electronic control system of the firearm, and the electronic control system of the firearm in response may issue appropriate control signals to firearm subsystems to control the arm/disarm functionality of the firearm by allowing or disallowing operation of the lower level system.

The firearm may be provided with an arm/disarm control interface illustratively including a touch-sensitive screen through which a firearm operator may monitor and control the firearm. The firearm may be provided with an arm/disarm control interface through which a remote operator or service may monitor and control the firearm.

The electronic control system of this disclosure may minimize any attempt by an operator to tamper with the firearm in an attempt to bypass the electronic control system. This is because the electronic control system of this disclosure configures the firearm in a disarmed state. Unless the firearm is properly energized according to this disclosure and the conditions that allow the firearm to be armed as taught by this disclosure are satisfied, the firearm will remain disarmed. The complexities of a work-around serve as a disincentive to further tampering. Greater integration of the firearm subsystem into the firearm may further disincentivize tampering since it may make it more difficult to remove the obstacle that prevents the operation of the firearm (e.g., the plunger blocking the firing pin in the solenoid electromagnet example). Even more measures may be taken to prevent disassembly of the firearm subsystem or other components of this disclosure to get around the disarming of the firearm.

In an illustrative method according to this disclosure, a trigger event is detected and a condition is detected. The condition is compared to a predetermined condition. The firearm is disarmed if the condition matches the predetermined condition. The predetermined condition may be a shape (e.g., in the shape of a human), a location (e.g., in a dead zone), the identity of the operator, whether or not the firearm has been tampered with (e.g., electronic control system or sensors have been tampered with), and so on.

An illustrative computer readable medium according to this disclosure contains program instructions for causing a computer to perform the method of detecting a trigger event; detecting a condition; comparing the condition to a predetermined condition; disarming the firearm if the condition matches the predetermined condition. The predetermined condition may be a shape (e.g., in the shape of a human), a location (e.g., in a dead zone), the identity of the operator, whether or not the firearm has been tampered with (e.g., electronic control system or sensors have been tampered with), and so on.

While the disclosure has been described in conjunction with specific embodiments, it is evident that numerous alternatives, modifications, and variations will be apparent to those skilled in the art within the spirit and scope of the disclosure described above.

We claim:

1. A firearm device comprising:
   a firearm;
   a firearm subsystem,
   at least one sensor, and
   an electronic control system, the electronic control system including a processor, a memory, and executable instructions stored in the memory;
   wherein the at least one sensor generates data on a target at which the firearm is aimed;
   wherein the memory stores processor executable instructions for enabling the firearm;
   wherein the memory stores a memory map of at least one data on a permitted target for enabling the firing of the firearm;
   wherein the processor determines if the sensor generated target data matches a permitted target data;
   wherein the processor enables the firearm subsystem if the sensor generated target data matches the permitted target data.

2. The firearm device of claim 1 wherein the at least one sensor is a light sensor.

3. The firearm device of claim 1 wherein the at least one sensor is a microphone sensor.

4. The firearm device of claim 1 wherein the electronic control system further comprises an arm/disarm control interface, the electronic control system configured to provide data on the firearm.

5. The firearm device of claim 4 wherein the arm/disarm control interface is a touch-sensitive scree configured to provide haptic or tactile input to the electronic control system and to render a display of data from the electronic control system.

6. The firearm device of claim 4 wherein the electronic control system further comprises a wireless network interface, the wireless network interface being configured to communicate data to a remote location.

7. The firearm device of claim 6 wherein the remote location is an external utility.

8. The firearm device of claim 7 wherein the external utility is configured for bi-directional communication with the electronic control system.

9. The firearm device of claim 8 wherein the bi-directional communication of the external utility with the electronic control system is selected from the group consisting of historical data, informational data, and control signals, and any combination thereof.

10. The firearm device of claim 8 wherein the bi-directional communication of the external utility with the electronic control system is a control signal.

11. The firearm device of claim 8 wherein the bi-directional communication of the external utility with the electronic control system is data selected from the group consisting of firearm registrant, registration data, permitted firearm operators, firearm operator recognition, date of use, location of use, firearm restrictions, and any combination thereof.

12. The firearm device of claim 7 wherein access to the external utility is selected from the group consisting of an owner of the firearm, an authorized operator of the firearm, a manufacturer of the firearm, a seller of the firearm, a 911 operator, a person or entity having oversight over use of a firearm, and any combination thereof.

13. The firearm device of claim 7 wherein the external utility is configured to track the movement of the firearm.

14. The firearm device of claim 1:
wherein the firearm electronic control system processor enablement of the firearm subsystem if the sensor generated target data matches the permitted target data is determined by government regulation or by law.

15. The firearm device of claim 1:
wherein the firearm electronic control system processor enablement of the firearm subsystem if the sensor generated target data matches the permitted target data is determined by the firearm device being within a predetermined radius of a fixed geographic location.

16. The firearm device of claim 1:
wherein the firearm electronic control system processor enablement of the firearm subsystem if the sensor generated target data matches the permitted target data is determined by the firearm device being within a predetermined radius of operation of the firearm device.

17. The firearm device of claim 1:
wherein the firearm electronic control system processor enablement of the firearm subsystem if the sensor generated target data matches the permitted target data is based upon programmed service subscription information.

18. The firearm device of claim 1:
wherein the firearm electronic control system processor enablement of the firearm subsystem if the sensor generated target data matches the permitted target data is based upon the identity of an operator.

19. The firearm device of claim 1 further comprising a biometric operator monitor, the biometric operator monitor configured to determine authentication of an operator using the firearm device:
wherein the firearm electronic control system processor enablement of the firearm subsystem if the sensor generated target data matches the permitted target data is based upon authentication of the operator.

20. The firearm device of claim 19 wherein the biometric operator monitor employs a biometric identification technique selected from the biometric identification techniques consisting of face recognition, fingerprint identification, hand geometry biometrics, retina scan, iris scan, signature, and voice analysis.

21. The firearm device of claim 1:
wherein the firearm electronic control system processor non-enablement of the firearm subsystem if the sensor generated target data does not match the permitted target data is overridden if the operator of the firearm device is a person with permission to over-ride a disarm condition of the firearm device.

22. The firearm device of claim 21:
wherein the person with permission to over-ride a disarm condition of the firearm device is selected from the group consisting of a law enforcement officer, a military soldier, and other person with permission to over-ride a disarm condition of the firearm device.

23. The firearm device of claim 1:
wherein the firearm electronic control system processor enablement of the firearm subsystem if the sensor generated target data matches the permitted target data is overridden if the firearm device has been tampered with.

24. The firearm device of claim 1 wherein the at least one sensor is selected from the group consisting of a heat sensor, a location accelerometer, a gyroscope, a magnetometer, a proximity sensor, a gravity sensor, a linear accelerometer, a light sensor, a camera sensor, a microphone sensors, a touch sensor, a pressure sensor, a temperature sensor, and a humidity sensor.

25. The firearm device of claim 1 further comprising a light source, the light source configured to reflect light off a target at which the firearm is aimed.

26. A firearm device comprising:
a firearm;
a firearm subsystem,
at least one sensor,
wherein the firearm is configured for adaption to an electronic control system residing in a mobile wireless device, the electronic control system including a processor, a memory, and executable instructions stored in the memory;
wherein the at least one sensor generates data on a target at which the firearm is aimed;
wherein the memory stores processor executable instructions for enabling the firearm;
wherein the memory stores a memory map of at least one data on a permitted target for enabling the firing of the firearm;
wherein the processor determines if the sensor generated target data matches a permitted target data;
wherein the processor enables the firearm subsystem if the sensor generated target data matches the permitted target data.

27. The firearm device of claim 26 wherein the electronic control system further comprises an arm/disarm control interface, the electronic control system configured to provide data on the firearm.

28. The firearm device of claim 26 wherein the electronic control system further comprises a wireless network interface, the wireless network interface being configured to communicate data to a remote location.

29. The firearm device of claim 28 wherein the remote location is selected from the group consisting of a mobile wireless device and an external utility.

30. The firearm device of claim 29 wherein the external utility is configured to track the movement of the firearm.

31. The firearm device of claim 26 wherein the adaption of the firearm to the electronic control system is by a wireless communication connection.

32. The firearm device of claim 26 wherein the adaption of the firearm to the electronic control system is by a hardwire communication connection.

33. The firearm device of claim 26 wherein the adaption of the firearm to the electronic control system is by a docking station, the docking station receiving the mobile wireless device, the docking station configured to provide a communication connection between the electronic control system and the firearm.

34. The firearm device of claim 26:
wherein the mobile wireless device electronic control system processor enablement of the firearm subsystem if the sensor generated target data matches the permitted target data is determined by government regulation or by law.

35. The firearm device of claim 26:
wherein the mobile wireless device electronic control system processor enablement of the firearm subsystem if the sensor generated target data matches the permitted target data is determined by the firearm device being within a predetermined radius of a fixed geographic location.

36. The firearm device of claim 26:
wherein the mobile wireless device electronic control system processor enablement of the firearm subsystem if the sensor generated target data matches the permitted target data is determined by the firearm device being within a predetermined radius of operation of the wireless device.

37. The firearm device of claim 26:
wherein the mobile wireless device electronic control system processor enablement of the firearm subsystem if the sensor generated target data matches the permitted target data is based upon programmed service subscription information.

38. The firearm device of claim 26:
wherein the mobile wireless device electronic control system processor enablement of the firearm subsystem if the sensor generated target data matches the permitted target data is based upon the identity of an operator.

39. The firearm device of claim 26 further comprising a biometric operator monitor, the biometric operator monitor configured to determine authentication of an operator using the firearm device:
wherein the mobile wireless device electronic control system processor enablement of the firearm subsystem if the sensor generated target data matches the permitted target data is based upon authentication of the operator.

40. The firearm device of claim 39 wherein the biometric operator monitor employs a biometric identification technique selected from the biometric identification techniques consisting of face recognition, fingerprint identification, hand geometry biometrics, retina scan, iris scan, signature, and voice analysis.

41. The firearm device of claim 26:
wherein the mobile wireless device electronic control system processor non-enablement of the firearm subsystem if the sensor generated target data does not match the permitted target data is overridden if the operator of the firearm device is a person with permission to over-ride a disarm condition of the firearm device.

42. The firearm device of claim 41:
wherein the person with permission to over-ride a disarm condition of the firearm device is selected from the group consisting of a law enforcement officer, a military soldier, and other person with permission to over-ride a disarm condition of the firearm device.

43. The firearm device of claim 26:
wherein the mobile wireless device electronic control system processor enablement of the firearm subsystem if the sensor generated target data matches the permitted target data is overridden if the firearm device has been tampered with.

44. The firearm device of claim 26 wherein the at least one sensor is selected from the group consisting of a heat sensor, a location accelerometer, a gyroscope, a magnetometer, a proximity sensor, a gravity sensor, a linear accelerometer, a light sensor, a camera sensor, a microphone sensors, a touch sensor, a pressure sensor, a temperature sensor, and a humidity sensor.

45. The firearm device of claim 26 further comprising a light source, the light source configured to reflect light off a target at which the firearm is aimed.

46. A firearm device comprising:
a firearm;
a firearm subsystem,
at least one sensor,
wherein the firearm is configured for adaption to an electronic control system residing in an external utility, the electronic control system including a processor, a memory, and executable instructions stored in the memory;
wherein the at least one sensor generates data on a target at which the firearm is aimed;
wherein the memory stores processor executable instructions for enabling the firearm;
wherein the memory stores a memory map of at least one data on a permitted target for enabling the firing of the firearm;
wherein the processor determines if the sensor generated target data matches a permitted target data;
wherein the processor enables the firearm subsystem if the sensor generated target data matches the permitted target data.

47. The firearm device of claim 46:
wherein the external utility electronic control system processor enablement of the firearm subsystem if the sensor generated target data matches the permitted target data is determined by government regulation or by law.

48. The firearm device of claim 46:
wherein the external utility electronic control system processor enablement of the firearm subsystem if the sensor generated target data matches the permitted target data is determined by the wireless device being within a predetermined radius of a fixed geographic location.

49. The firearm device of claim 46:
wherein the external utility electronic control system processor enablement of the firearm subsystem if the sensor generated target data matches the permitted target data is determined by the wireless device being within a predetermined radius of operation of the wireless device.

50. The firearm device of claim 46:
wherein the external utility electronic control system processor enablement of the firearm subsystem if the sensor generated target data matches the permitted target data is based upon programmed service subscription information.

51. The firearm device of claim 46:
wherein the external utility electronic control system processor enablement of the firearm subsystem if the sensor generated target data matches the permitted target data is based upon the identity of an operator.

52. The firearm device of claim 46 further comprising a biometric operator monitor, the biometric operator monitor configured to determine authentication of an operator using the firearm device:
wherein the external utility electronic control system processor enablement of the firearm subsystem if the sensor generated target data matches the permitted target data is based upon authentication of the operator.

53. The firearm device of claim 52 wherein the biometric operator monitor employs a biometric identification technique selected from the biometric identification techniques consisting of face recognition, fingerprint identification, hand geometry biometrics, retina scan, iris scan, signature, and voice analysis.

54. The firearm device of claim 46:
wherein the external utility electronic control system processor non-enablement of the firearm subsystem if the sensor generated target data does not match the permitted target data is overridden if the operator of the firearm device is a person with permission to over-ride a disarm condition of the firearm device.

55. The firearm device of claim 54:
wherein the person with permission to over-ride a disarm condition of the firearm device is selected from the group consisting of a law enforcement officer, a military soldier, and other person with permission to over-ride a disarm condition of the firearm device.

56. The firearm device of claim 46:
wherein the external utility electronic control system processor enablement of the firearm subsystem if the sensor generated target data matches the permitted target data is overridden if the firearm device has been tampered with.

57. The firearm device of claim 46 wherein the at least one sensor is selected from the group consisting of a heat sensor, a location accelerometer, a gyroscope, a magnetometer, a proximity sensor, a gravity sensor, a linear accelerometer, a light sensor, a camera sensor, a microphone sensors, a touch sensor, a pressure sensor, a temperature sensor, and a humidity sensor.

58. The firearm device of claim 46 further comprising a light source, the light source configured to reflect light off a target at which the firearm is aimed.

59. The firearm device of claim 46 wherein the external utility is configured to track the movement of the firearm.

60. A method for controlling a firearm configured with a sensor comprising:
storing in a memory of an electronic control system a memory map, the electronic control system being associated with the firearm and configured to enable the firearm, the memory map comprising at least one data on a permitted target for enabling the firing of the firearm;
determining if target data generated by the sensor matches a permitted target data; and
enabling the firearm if the sensor generated target data matches the permitted target data.

61. The method of claim 60 further comprising the step of:
determining the permitted target data by government regulation or by law.

62. The method of claim 60 further comprising the step of:
determining the permitted target data by the firearm being within a predetermined radius of a fixed geographic location.

63. The method of claim 60 further comprising the step of:
determining the permitted target data by the firearm being within a predetermined radius of operation of the firearm.

64. The method of claim 60 further comprising:
determining the permitted target data by programmed service subscription information.

65. The method of claim 60 further comprising the step of:
determining the permitted target data by identity of an operator.

66. The method of claim 60 further comprising the step of:
determining the permitted target data by authentication of the operator.

67. The method of claim 60 further comprising the step of:
overriding a disarm condition by a person with permission to over-ride the disarm condition of the firearm.

68. The method of claim 60 further comprising the step of:
overriding a disarm condition if the firearm has been tampered with.

* * * * *